United States Patent [19]

Kohl

[11] Patent Number: 4,766,031
[45] Date of Patent: Aug. 23, 1988

[54] INTEGRAL FOAM BODY AND METHOD OF MANUFACTURING THE SAME

[76] Inventor: Walter Kohl, Händelstrasse 5, 6780 Pirmasens, Fed. Rep. of Germany

[21] Appl. No.: 898,133

[22] Filed: Aug. 19, 1986

Related U.S. Application Data

[63] Continuation of Ser. No. 692,926, Jan. 17, 1985, abandoned.

[30] Foreign Application Priority Data

Jan. 17, 1984 [DE] Fed. Rep. of Germany ....... 3401438

[51] Int. Cl.⁴ ........................... B32B 1/00; B32B 3/20; B32B 5/22
[52] U.S. Cl. .................................. 428/317.9; 428/188; 428/318.4; 428/318.6; 428/318.8; 264/45.3; 264/45.5
[58] Field of Search .................. 428/188, 304.4, 314.4, 428/314.8, 317.9, 318.6, 318.8, 318.4; 264/45.3, 45.5, 45.9, 46.1, 53, 211; 521/51, 79

[56] References Cited

U.S. PATENT DOCUMENTS

| | | | |
|---|---|---|---|
| 3,474,048 | 10/1969 | Chappelear et al. | 521/91 |
| 3,764,642 | 10/1973 | Boutillier | 428/318.8 |
| 4,163,824 | 8/1979 | Saidla | 428/317.9 |
| 4,399,086 | 8/1983 | Walter | 264/45.5 |

FOREIGN PATENT DOCUMENTS

| | | |
|---|---|---|
| 1729076 | 12/1970 | Fed. Rep. of Germany . |
| 1913921 | 5/1971 | Fed. Rep. of Germany . |
| 2745373 | 4/1978 | Fed. Rep. of Germany . |
| 3016333 | 11/1980 | Fed. Rep. of Germany . |
| 3011692 | 10/1981 | Fed. Rep. of Germany . |
| 3113810 | 10/1982 | Fed. Rep. of Germany ... 428/318.8 |

*Primary Examiner*—William J. Van Balen
*Attorney, Agent, or Firm*—Michael J. Striker

[57] ABSTRACT

An integral foam body has a body part composed of an extruded hard thermoplastic material with a plurality of staple fibers of high tensile strength embedded in the thermoplastic material.

20 Claims, 1 Drawing Sheet

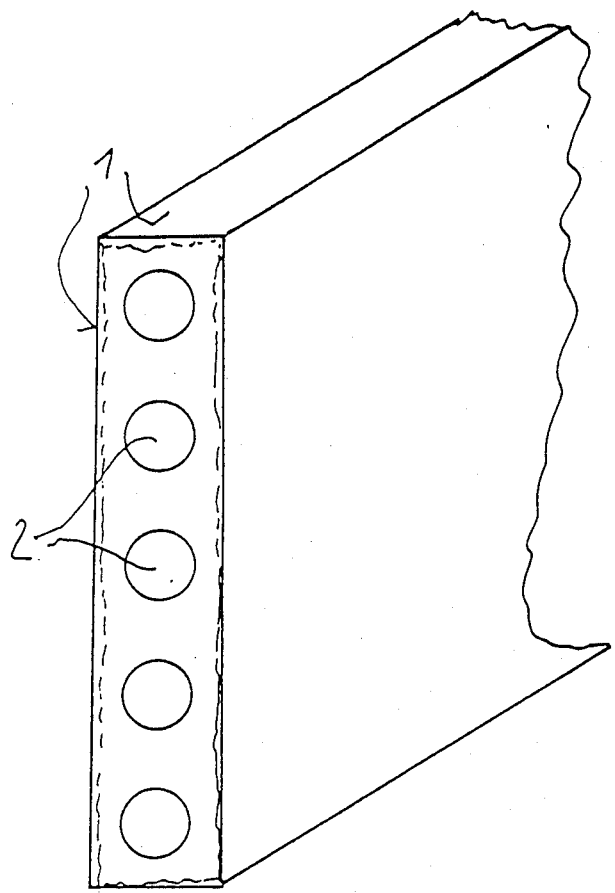

INTEGRAL FOAM BODY AND METHOD OF MANUFACTURING THE SAME

This is a continuation of application Ser. No. 692,926, filed Jan. 17, 1985, now abandoned.

BACKGROUND OF THE INVENTION

The present invention relates to an integral foam body and a method of manufacturing the same.

The term "integral foam body" is understood to mean a foam material body of synthetic plastic with an outer skin which is substantially not foamed and normally has a thickness of 0.2 mm–2 mm, as a rule approximately 1 mm. Such an integral foam body has an outer surface whose appearance corresponds to the appearance of a massive body of the respective synthetic plastic but with a substantially lower weight, has a bending resistance which corresponds to the bending resistance of a massive synthetic plastic body of the same dimension but considerably exceeds the weight of the latter.

Integral foam bodies can be produced of duroplastic or thermoplastic synthetic plastic material, whereas the not foamed pore-free outer skin is produced by a suitable tempering of the outer surface of the foamed synthetic plastic.

Methods of manufacturing extruded integral foam shaped members of thermoplastic material are known from DE-OS No. 1,729,076 and DE-OS No. 1,913,921. From DE-OS No. 3,011,692 it is also known to place relatively thick and long staple fibers between the balls of a body assembled from polyvinyl chloride foam balls, and before this they are coated with an adhesive agent. The purpose of this feature is to form a spatial supporting grate for individual foam balls of the polyvinyl chloride foam so as to prevent substantially the cracking of a finished foam body.

It is further known from the DE-OS No. 3,016,333 to mix liquid initial material for duroplastic synthetic plastic to approximately one-third of its weight with very short staple fibers and then mix this mixture homogenously with a gas. The bubbles of the gas in the initial material must replace the gas bubbles produced by a propellant and fixed by the fine staple fibers until the end of hardening of the synthetic plastic. It is also known to embed short staple fibers in extruded, flexible foam of massive synthetic plastic.

Finally, an integral foam body is disclosed in the DE-OS No. 2,745,373, in which staple fibers are added to the initial product used for foaming of an integral foam body of polyurethane in a mold to improve the mechanical properties of the finished integral foam body. The staple fibers are embedded in the integral foam body in statistically distributed orientation. The manufacture of such an integral foam body is expensive, since for each body the mold must be filled, closed and after hardening of the foam body again opened, whereupon the foam body can be removed.

SUMMARY OF THE INVENTION

Accordingly, it is an object of the present invention to provide an integral foam body and a method of manufacturing the same, which avoids the disadvantages of the prior art.

More particularly, it is an object of the present invention to provide such a foam body whose mass production is possible with low expenses, and also to provide a method of manufacturing of such an integral foam body.

In keeping with these objects and with others which will become apparent hereinafter, one feature of the present invention resides, briefly stated, in an integral foam body which has a body part with a plurality of staple fibers having high tensile strength and embedded in the body part, wherein the body part is formed as an extruded hollow or solid shaped body part of hard thermoplastic material, particularly of polyvinyl chloride.

Another feature of the present invention is a method of manufacturing an integral foam body in accordance with which a foamed initial mixture is mixed with the staple fibers, foamed and molded and the formation of the integral foam skin is controlled by regulation of a temperature of a chamber wall, wherein a mixture of synthetic plastic particles, propellant and fibers in some cases with addition of stabilizers and other extrusion aids is plastified and extruded with the aid of a screw extruder, foamed after leaving the extrusion nozzle, and solidified in a calibrating and cooling passage arranged after the nozzle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a perspective view showing a part of an integral foam body in accordance with the present invention.

DESCRIPTION OF THE PREFERRED EMBODIMENTS

An integral foam body in accordance with the present invention has a body part with a plurality of staple fibers having a high tensile strength and distributed over the cross-section of the body part, wherein the body part is formed as an extruded shaped body part of hard thermoplastic synthetic material, particularly of polyvinyl chloride.

In a surprising manner the naturally hard and relatively brittle fibers of high tensile strength can be processed in an extruder without being comminuted to unacceptably high degree. They also do not prevent the foaming after exiting the extrusion nozzle.

A further surprising advantage of the present invention is that as a rule an exceptional surface quality is obtained.

When the syntnetic plastic after the extrusion is foamed, and an integral skin is formed by cooling of the surface of the molding passage, a body is produced with an outer surface whose nature can be adjusted by selection of the fiber fraction and the foam density. A high fiber filling and heavy foam produce a smooth outer surface, whereas a high fiber filling and a light foam produces a rough outer surface which is not however unsightly. A very light foam and a fiber filling up to 50% produce a smooth outer surface.

The inventive shaped body has many of unexpected advantages. The shrinkage which takes place in an extruded integral foam body under high temperatures is drastically decreases. In the same manner the thermal expansion and thereby the tendency to distortion with one-sided temperature loading is reduced. The inventive body has unexpectedly a high ball-pressure hardness and possesses higher tensile strength properties required for such bodies (bending modules, permissible bending and compressive stress, as well as screw pulling-out force). The foam body in accordance with the present invention is composed as a rule and advantageously of synthetic plastics which do not contain a softener or contain it only in a small quantity. Preferably it is hard polyvinyl chloride.

In accordance with an advantageous feature of the present invention, especially good results are obtained when the polyvinyl chloride has a k-value between 50 and 70, and advantageously between 5 and 63, the fiber portion amounts to between 5 and 35 weight percent and advantageously between 15 and 20 weight percent with the best amount of approximately 15 weight percent, the fiber length amounts to between 2 and 20 mm and advantageously between 4 and 6 mm with the best length approximately 4.5 mm, and the thickness of the fibers amounts to between 3 and 15 µm and advantageously between 10 and 13 µm, wherein the fibers are first treated with an adhesive agent. With generally preferably glass fibers, a surface treatment is performed with silan compounds for improving adhesion. Advantageously for the fibers the material such as E-and-C glass is used. It is recommended to use, for example, glass fibers of the company "Owens-Corning Fiberglass Europe, Brussels, of the type 885 ZZ,429 ZZ and 429 YZ. The best fibers which are recommended are the fibers of the last mentioned type.

In the surprising manner the inventive body can be produced not only with the use of fresh polyvinyl chloride powder but also of polyvinyl chloride wastes and polyvinyl chloride regenerates. The specific properties of the foamed polyvinyl chloride does not affect the distribution of the fibers and the surface formation; there is always a clear surface despite the embedding of fibers. The body can also be formed as a composite body in which a solid carrier body such as for example a metal hollow shaped body is extrusion-coated with a thermoplastic fiber-added foamed synthetic plastic. Because of the low thermal expansion and the low shrinkage such a composite body preserves the good adhesion between the synthetic plastic foam and the metal or carrier body without tension damages in the transition region or in the foam material. The inventive body can also be provided in its hollow space with an inserted reinforcement which can be glued with the body in some cases.

On the above mentioned grounds the inventive body is advantageously used when a one-sided thermal loading takes place and a smooth or structured visible surface is required. In accordance with the present invention the body can be used as a frame bar for stationary frames and movable frames of doors and windows, as a coating bar or coating plate particularly for outer coatings of constructions, and also as a fence bar, a rail bar, or a handrail bar, etc. Since the inventive body can be formed as a hollow shaped body it is possible to produce it for the respective expected loading with a minimum material consumption and thereby at an especially favorable price.

Wear which is expected to take place during use of extruder and particularly of its nozzle for extrusion of a foam material with hard and rigid fibers does not take place in accordance with the present invention.

In accordance with the inventive method a mixture of synthetic plastic particles, synthetic regenerate and/or synthetic plastic waste with a swelling agent and the fibers are produced, it is plasticized, extruded and foamed in a screw extruder, and solidified in a calibrating and cooling passage located after the extrusion nozzle. The mixture can be prepared and stored either before its feeding into the extruder or better made during its feeding into the extruder. For preventing destruction of the fibers, and in particular the glass fibers by feazing of their ends during the mixing step and particularly during the plasticizing step, the staple fibers are added to a synthetic plastic mixture advantageously not as a loose material but assembled in small individual staples, so-called chips. These chips form a unit and guarantee a support of fibers during the mixing step and during entering the extruder. They are decomposed first inside the extruder so that the individual fibers can be distributed unobjectionably in the plasticized synthetic plastic. During a manufacture of the mixture their components must be acted upon carefully so as to prevent the premature destruction of the glass fiber chips.

The glass fiber chips simultaneously promote the fluidity of the mixture and thereby provide the uniform charging and therefore the uniform property of the mixture with higher reliability. Thereby the expenses during charging are reduced and the quality of the obtained body can be maintained constant.

Advantageously, more propellant is added to the mixture at least more by 1 percent, then would be required in the case of extrusion of a fiber-free integral foam body, to guarantee the distribution of the fibers.

The single FIGURE of the drawing shows a perspective view of an end of a shaped bar for a railing, as an example of the inventive body and produced in accordance with the inventive method. This railing bar serves for a coating of the outer border of a balcony and must withstand during year long weather actions such loads which takes place when a person slips or supports against the balcony railing. The balcony shaped bar must not yield, break or crack at the screw locations.

The shown railing bar is formed as a board-like body with elongated rectangular cross-section and is composed of a polyvinyl chloride hard foam which is reinforced in the region of its outer surface 1 by a carrying and rigid skin. The outer surface of the skin 1 is either smooth (in this case the outer surface is coated) or rough (in this case the outer surface is coated or rubbed).

Round passages 2 extend in the interior of the cross-section of the bar axially to the bar and parallel to one another. They extend with the same distance at opposite sides along the longer main axis of the rectangular bar cross-section and centrally of the latter.

The above-described bar is produced by an extruder from a mixture having the following composition:

|  | Weight Contents |
|---|---|
| S-PVC-powder (k-value 58) | 100 |
| High molecular acrylate | 6 |
| Mark WS (barium-cadmium-salt) | 4 |
| Calcium stearate | 0.5 |
| Silicium dioxide | 0.5 |
| Glass fiber chips of type 429 YZ of the company "Owens Corning Fiberglass Europe", Brussels, length 4.5 mm | 15 |

The mixture of the above listed components is mixed in a stirring mechanism with a slowly running stirrer for 2 minutes and then supplied into a filling funnel of an extruder.

The extruder is a double screw extruder with screws having a diameter of 65 mm, a length of 17 diameters and a compression of 2.5. The extruder is provided after the screws with a perforated disc having 6 mm openings. It is further provided with an extruding head with a rectangular nozzle of a size 20 mm×120 mm with 5 pins informally distributed in the center axis. Each pin has a diameter of 12 mm. A rectangular calibrating device in which the pins extend is arranged immediately after the outlet of the extrusion nozzle and coaxially with the latter. A discharge device of a known type is arranged at the outlet of the calibrating device.

Following extruder conditions were used:

The temperature of the cylinder of the extruder of the inlet funnel were 160°-170°-170°-175°-160° C.

The temperature of the head and the extrusion nozzle was 190° C.

The screw was tempered to 95° C.

The speed of the screw was 18 revolutions per minute.

The delivery speed of the extruded and foamed integral foam bar was 65 cm/min.

The calibrating device was cooled by circulation of water of approximately 90° C. without vacuum.

The average density of the bar amounted to 0.63 g/cm³ corresponding to an output of 59 kg/h.

The thickness of the integral foam skin which was practically without pores amounts to approximately 1 mm on the outer skin and 0.75 mm on the inner skin which surrounds the relief passages 2.

The finished bar had a completely smooth outer surface.

It will be understood that each of the elements described above, or two or more together, may also find a useful application in other types of constructions differing from the types described above.

While the invention has been illustrated and described as embodied in an integral foam body and method of manufacturing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An integral foam body, comprising
a body part formed by extrusion of hard polyvinyl chloride foam;
a plurality of staple fibers having a high tensile strength and a length of between 2 and 20 mm, said staple fibers being embedded in said body part in a randomly distributed manner and being provided in a quantity of between 10 and 20 weight percent relative to the weight of said body part; and
a non-porous closed outer skin formed integrally with said body part and having an outer surface, the staple fibers being also embedded in said outer skin, and said hard polyvinyl chloride not affecting formation of the outer surface in that the outer surface remains smooth despite embedding of said staple fibers in the foamed body including the outer skin.

2. An integral foam body as defined in claim 1, wherein said staple fibers are selected from the group consisting of mineral fibers, glass fibers and carbon fibers.

3. An integral foam body as defined in claim 1, wherein said body part is formed as a bar.

4. An integral foam body as defined in claim 1, wherein said body part is formed as a plate.

5. An integral foam body as defined in claim 1, wherein said body part is formed as a pipe.

6. An integral foam body as defined in claim 1, wherein said fibers are provided in the quantity of approximately 15 weight percent relative to the weight of said body part.

7. An integral foam body as defined in claim 1, wherein said staple fibers have a length of between 4 and 6 mm.

8. An integral foam body as defined in claim 7, wherein said fibers have a length of approximately 4.5 mm.

9. An a foam body as defined in claim 1, wherein said fibers have a thickness of between 3 and 15 $\mu$m.

10. An integral foam body as defined in claim 9, wherein said fibers have a thickness of between 10 and 13 $\mu$m.

11. An integral foam body as defined in claim 1, wherein said fibers are glass fibers coated with an adhesive agent.

12. An integral foam body as defined in claim 1, and further comprising a carrier member, said body with said staple fibers extrusion-coating said carrier member.

13. An integral foam body as defined in claim 12, wherein said body with said carrier member is formed as a frame bar for a door frame.

14. An integral foam body as defined in claim 12, wherein said body with said carrier is formed as a frame bar for a window.

15. An integral foam body as defined in claim 12, said body with said carrier member is formed as a coating bar.

16. An integral foam body as defined in claim 12, wherein said body with said carrier member is formed as a coating board.

17. An integral foam body as defined in claim 12, wherein said body with said carrier member is formed as a fence railing.

18. An integral foam body as defined in claim 12, wherein said body with said carrier member is formed as a balcony railing.

19. An integral foam body as defined in claim 14, wherein said hard polyvinyl chloride has a k-value of between 50 and 70.

20. An integral foam body as defined in claim 14, wherein said hard polyvinyl chloride has a k-value of between 55 and 63.

* * * * *